United States Patent
Wentland et al.

(10) Patent No.: US 7,222,820 B2
(45) Date of Patent: May 29, 2007

(54) AIRCRAFT LAVATORY

(75) Inventors: Mark E. Wentland, Lynnwood, WA (US); Jeanne Guerin, Mukilteo, WA (US); Bethany L. Franko, Seattle, WA (US); Shawn A. Claflin, Lake Stevens, WA (US); Douglas E. Emsley, Bothell, WA (US); Domenic S. Giuntoli, Seattle, WA (US); Melanie L. Kimsey, Seattle, WA (US); Hau T. Pho, Seattle, WA (US); Alan J. Anderson, Woodinville, WA (US); Charles C. Jensen, Seatac, WA (US); Michael D. Thoreson, Lynnwood, WA (US); Michael Jaquish, Northampton, MA (US); Wayne T. Yutani, Bellevue, WA (US); John A. Caldwell, Burien, WA (US); Richard K. Simms, Redmond, WA (US); Dennis C. Lin, Everett, WA (US); Thomas F. Pistler, Edmonds, WA (US); Kevin W. Shimasaki, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/775,565

(22) Filed: Feb. 10, 2004

(65) Prior Publication Data
US 2004/0227034 A1 Nov. 18, 2004

Related U.S. Application Data

(60) Provisional application No. 60/449,967, filed on Feb. 25, 2003.

(51) Int. Cl.
*B64D 11/02* (2006.01)

(52) U.S. Cl. .................. 244/118.5; 244/129.1

(58) Field of Classification Search ............. 244/118.5, 244/129.1; 4/664
See application file for complete search history.

(56) References Cited

U.S. PATENT DOCUMENTS

| | | | | |
|---|---|---|---|---|
| 1,731,531 | A | 10/1929 | Gott | 244/118.6 |
| 1,905,389 | A * | 4/1933 | Lanning | 244/118.5 |
| 2,817,091 | A * | 12/1957 | Painter | 4/664 |
| 4,884,767 | A | 12/1989 | Shibata | 244/118.5 |
| 5,309,146 | A * | 5/1994 | Kenet | 340/540 |
| 5,474,260 | A | 12/1995 | Schwertfeger et al. | 244/118.5 |
| 2002/0145080 | A1 * | 10/2002 | Renken et al. | 244/118.5 |

FOREIGN PATENT DOCUMENTS

| | | |
|---|---|---|
| DE | 19813866 | 9/1999 |
| JP | 05-155390 | 6/1993 |
| JP | 06-040399 | 2/1994 |

* cited by examiner

*Primary Examiner*—Robert P. Swiatek
(74) *Attorney, Agent, or Firm*—Lee & Hayes, PLLC

(57) ABSTRACT

A lavatory complex for an aircraft. The lavatory complex includes a male lavatory facility and a female lavatory facility. The male lavatory facility includes stall units and may include urinals. The female lavatory facility includes stall units. Each stall unit suitably includes a single commode. The male and female lavatory facilities include at least one sink separated from the stall units by stall unit doors. The lavatory complex may include sinks that are not located within either the male or female lavatory facilities. A lavatory may include illuminating indicators; an illuminated, folding, baby changing station; a vanity; a self-cleaning toilet; and/or an illuminated faucet.

7 Claims, 14 Drawing Sheets

AIRCRAFT LAVATORY

PRIORITY CLAIM

This application claims the benefit of U.S. Provisional Ser. No. 60/449,967, filed Feb. 25, 2003, which is hereby incorporated by reference.

FIELD OF THE INVENTION

This invention relates generally to aircraft and, more specifically, to aircraft lavatories.

BACKGROUND OF THE INVENTION

Current airplane lavatories are typically single, small units that include a commode and a sink. For example, the current aft end of the BOEING 777 commercial airplane, as shown in FIG. 1, includes a group of 6 individual lavatories. These six lavatories serve approximately 200 people. Therefore, each lavatory must serve approximately 34 people. When a passenger uses the lavatory unit, all the amenities of the unit are unavailable for use by another passenger—even when the passenger only occupies the unit to just use the sink. This can result in long lines of people waiting in the aisle for an available lavatory.

In order to reduce waiting times for aircraft lavatories, it may be attempted to increase the number of lavatories on board an aircraft. However, installing more lavatories also reduces the available space for passenger seats. This results in a decrease in the ability of such an aircraft to generate revenue for an airline.

Therefore, it would be desirable to provide more access to aircraft lavatory facilities with reduced wait times for passengers without adversely impacting revenue generation of an airplane. However, there is an unmet need to improve the efficiency of aircraft lavatories.

Further, airlines have indicated that passengers often have difficulty locating necessities in the lavatory. For example, passengers may not be sure where to find paper towels, how to get to the trashcan, or how to flush the toilet. This can lead to frustrated passengers and dirty facilities. Traditionally, items in the lavatory have been stored in discrete locations, which can cause them to be difficult for passengers to find. Placards are often included in lavatories, but placards can result in too many words to focus on or confusing symbols the passenger may not understand. Placards may also be subject to vandalization. Therefore, there is an unmet need to improve instructions for using an aircraft lavatory.

Moreover, passengers have also expressed a desire for enhanced lighting in the lavatory, especially around the mirror in order to prepare themselves for meetings after flights, etc. Thus, there is an unmet need to provide enhanced lighting in a lavatory.

SUMMARY OF THE INVENTION

The present invention provides separate male and female lavatory complexes that allow for efficient use of fixtures, thereby allowing more passengers to cycle through while providing a more comfortable atmosphere for the passengers.

One embodiment of the present invention includes an aircraft lavatory having stall units. Each stall unit suitably includes a single commode, and a sink is located external to the stall units. The lavatory is separated from the rest of the aircraft cabin.

In one aspect of the invention, the lavatory may also include a urinal.

In another aspect of the invention, a lavatory complex for an aircraft includes a male lavatory facility and a female lavatory facility. The male lavatory facility includes stall units and urinals. Each stall unit suitably includes a single commode. The female lavatory facility includes stall units. The male and female lavatory facilities include at least one sink separated from the stall units by stall unit doors.

In still another aspect of the invention, the lavatory complex includes sinks that are not located within either the male or female lavatory facilities.

In yet another aspect of the invention, a baby changing table is included in a single lavatory. The table folds into a wall unit and includes a light and diaper-holding pocket. The baby changing table may include a child seat where the child may be secured.

In still yet another aspect of the invention, indicator lights illuminate around various amenities, such as a waste basket, paper towel holder, toilet paper, etc. The lights activate based on a sensed action or motion.

In another aspect of the invention, a vanity mirror with adjustable lighting creates appropriate lighting for different skin tones.

In still another aspect of the invention, the present invention provides efficient use of space with a small footprint for maximizing seat space and efficient use of services/amenities. The present invention is also more accessible with more user friendly devices, such as indicator lights. The lavatories suitably are modular units that have self-contained plumbing and wiring for connection to airplane systems at an interface.

Services are available from the exterior of the lavatory to increase the user/unit ratio. Thus for the same space, more passengers are served, and each passenger may be served quicker.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
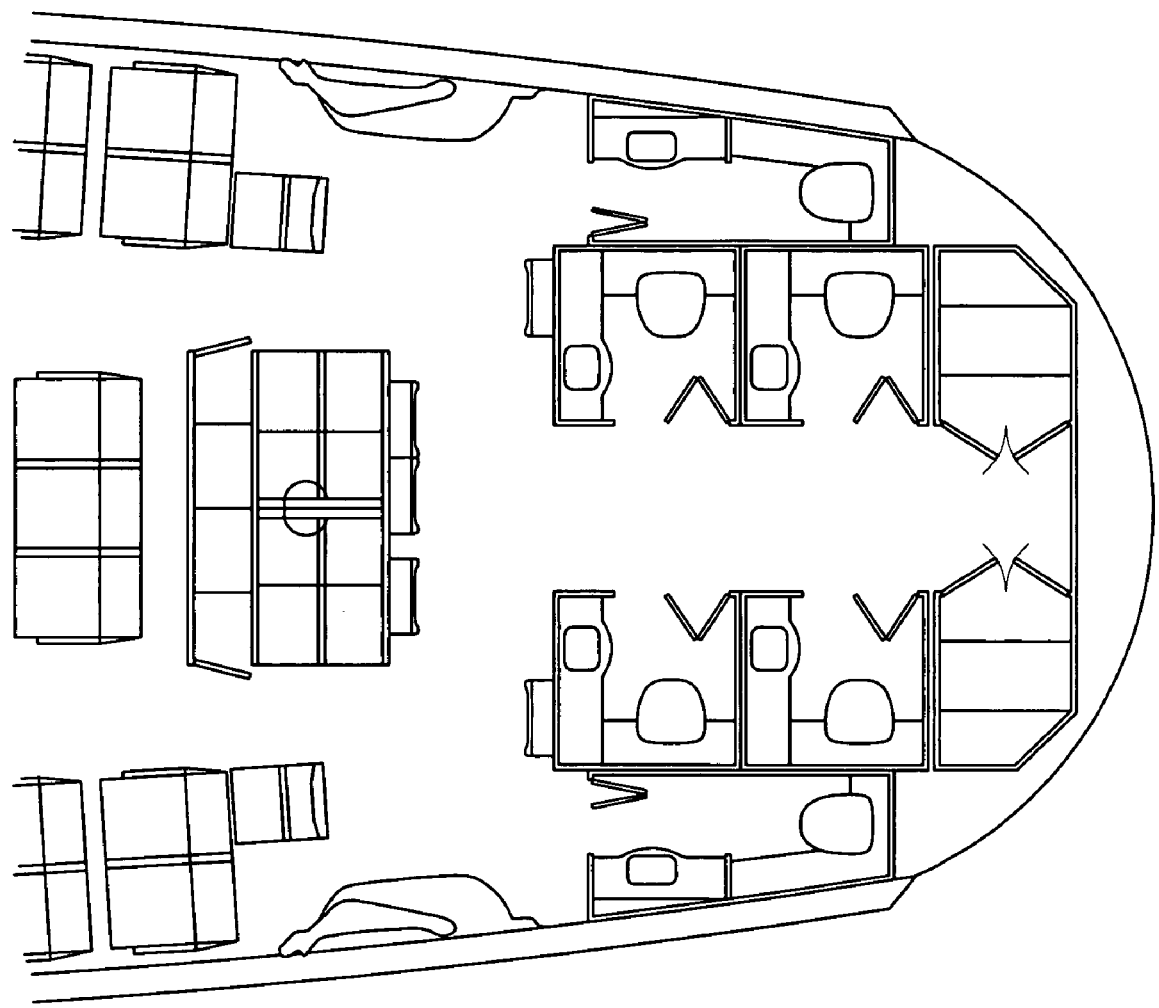
FIG. 1 is a top plan view of the prior art.
Figure 2:
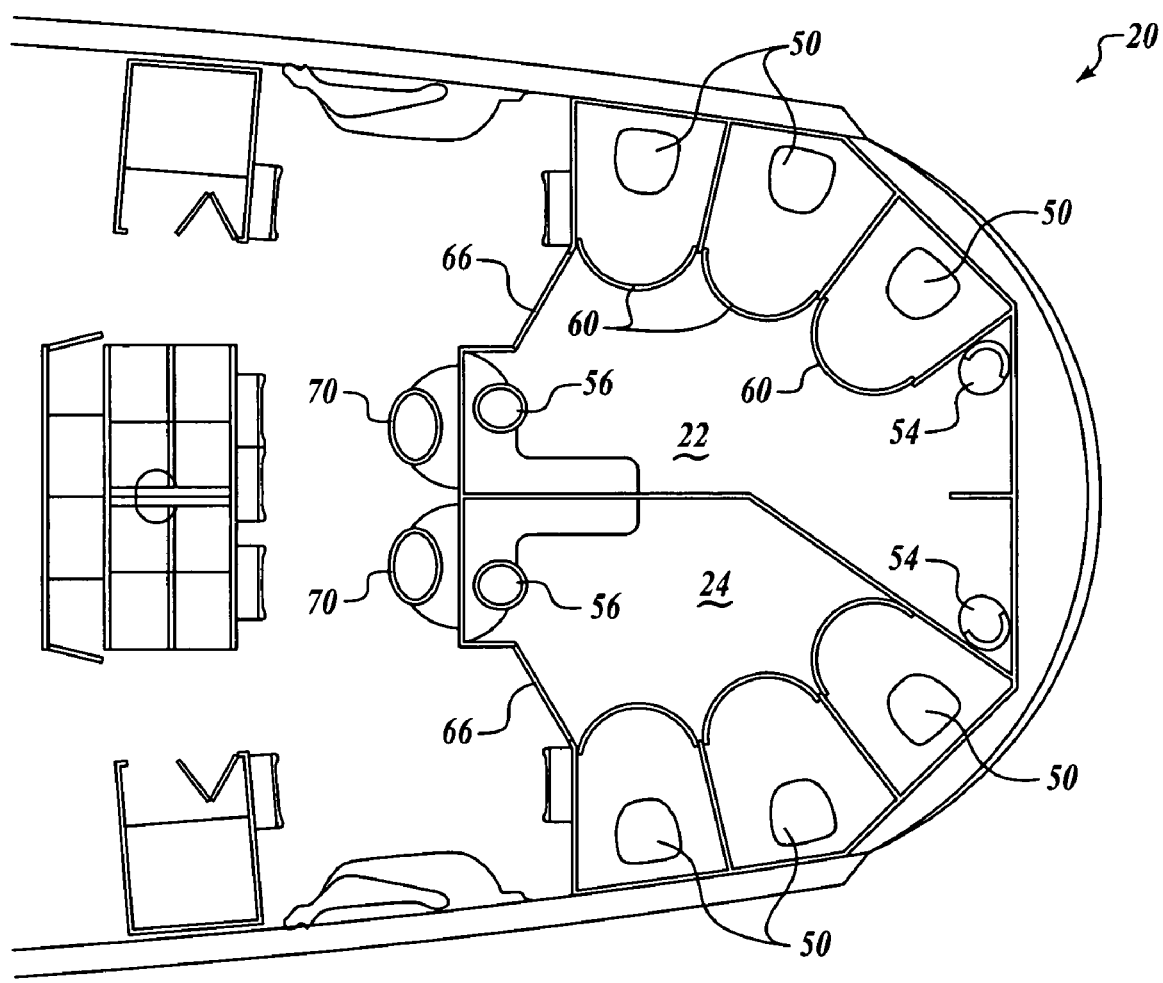
FIG. 2 is a top plan view of an embodiment of the present invention.
Figure 3:
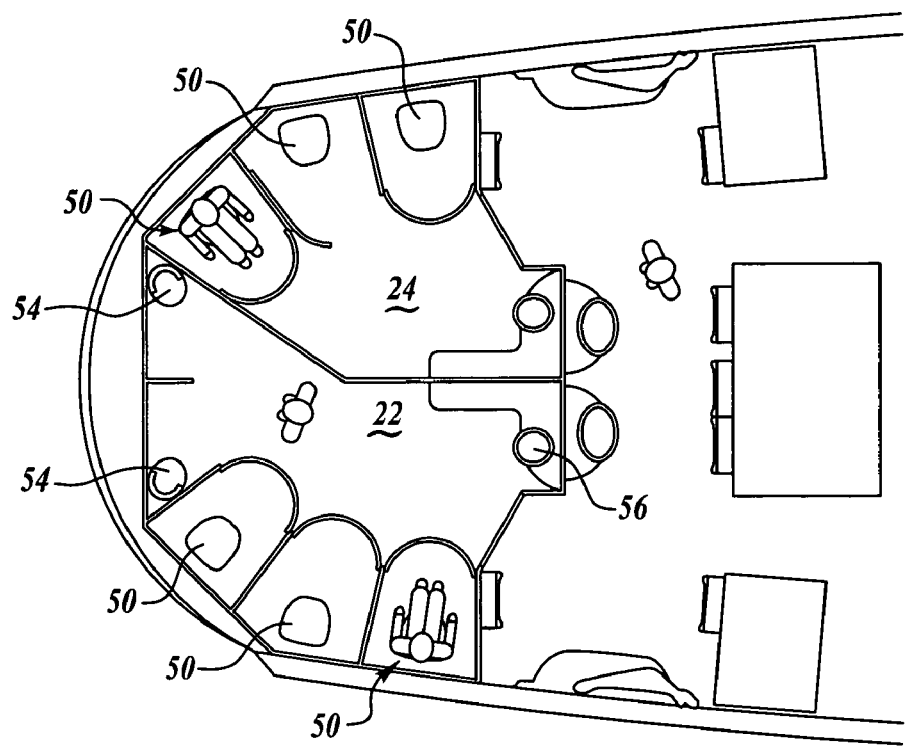
FIGS. 3 and 4 are three-dimensional top views of the embodiment shown in FIG. 2.
Figure 4:
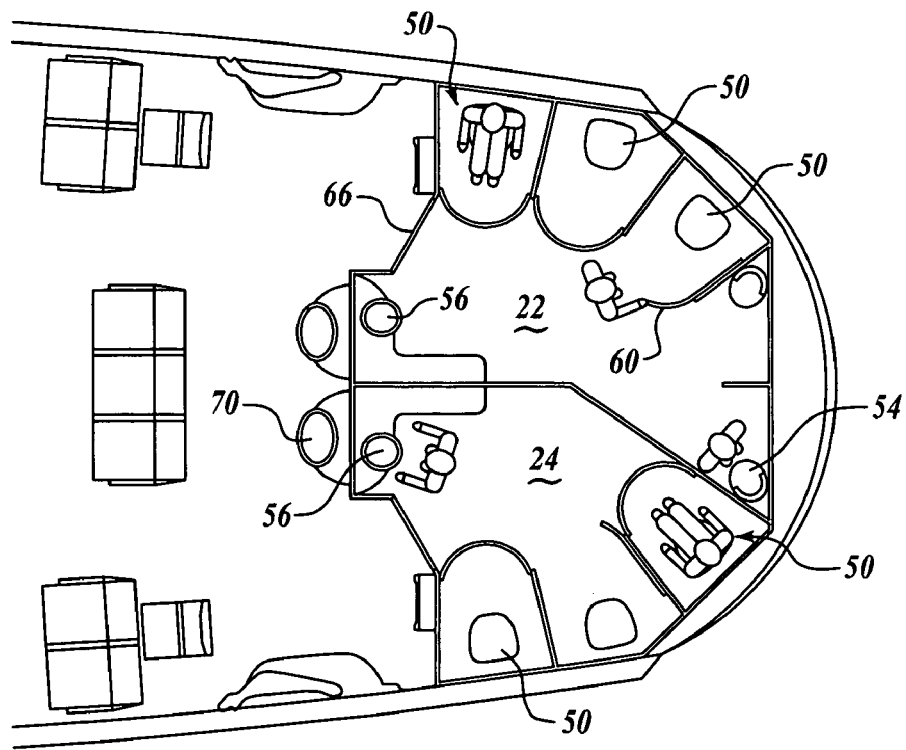

One embodiment of the present invention is an aircraft lavatory system with separated amenities. As shown in FIGS. 2–4, a non-limiting example of the present invention is an aircraft lavatory system 20 that includes a male facility 22 and a female facility 24.

The male facility 22 includes one or more commode stalls 50, one or more urinals 54, and a sink 56. Each commode stall 50 is separated from the urinals 54 and the sink 56 by a door 60. A door 66 separates the commode stalls 50, the urinals 54, and the sink 56 from the rest of the aircraft cabin. The female facility 24 is similar to the male facility 22 except the urinals 54 are not included.

The door 60 swings on a hinge into space within each facility 22 and 24. Alternatively, the door 60 is a flexible sliding door that slides along one of the walls of the respective stall.

The aircraft lavatory system 20 also includes one or more sinks 70 that are located outside both of the facilities 22 and 24. The sinks 70 are suitably larger than conventional aircraft sinks to allow for greater ease of use. Because the commode stalls 50 are separate from the sinks 56 and 70 and the male facility 22 includes urinals 54, use of passengers' time is more efficiently spent.

In one embodiment, the commode stalls 50 are approximately 32"×41" in dimension. However, it will be appreciated that the stalls 50 may have any dimensions as desired for particular application or particular aircraft.

Figure 5:
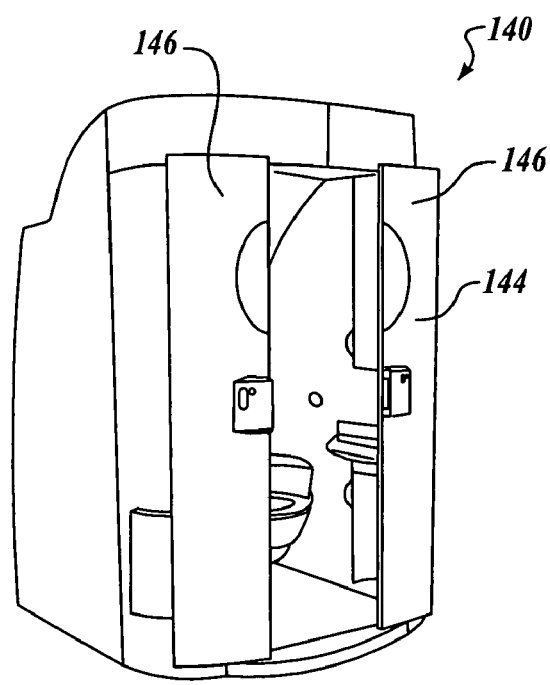
FIG. 5 is a perspective view of a toilet unit formed in accordance with an embodiment of the present invention.
Figure 6:
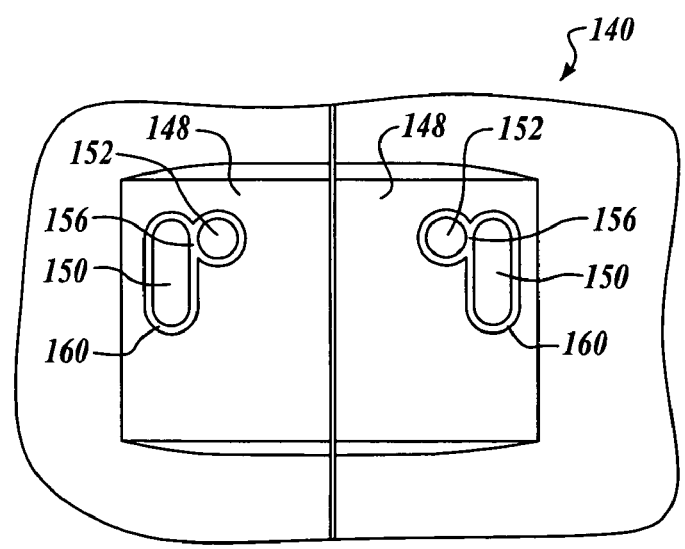
FIG. 6 is a view of external opening devices for the toilet unit shown in FIG. 5.

FIGS. 5–8 illustrate an exemplary door handle and locking device 140 according to an embodiment of the present invention. As shown in FIGS. 5 and 6, the door handle and locking device 140 is mounted on a door 144 with two sliding panels 146. The door 144 is an alternate, exemplary door that may be used with the commode stall 50 (FIGS. 2–4). The door handle and locking device 140 includes exterior handle housings 148. The exterior handle housings 148 include a first cavity 150 and a second cavity 152. The first cavity 150 has an elongated oval shape sized to receive a user's fingers and the second cavity 152 has a circular shape sized to receive a user's thumb. The first cavity 150 and the second cavity 152 are disposed adjacent to each other, thereby forming a ridge 156 that a user pinches to open or close the two sliding panels 146: The first cavity 150 and the second cavity 152 form the shape of a "P" or a reverse "P".

The door handle and locking device 140 may be used on any door where one desires to indicate occupancy.

The first and the second cavities 150 and 152 are suitably outlined with clear acrylic plates 160. Lights are positioned behind the clear acrylic plates 160 within the door handle housings 148. The lights illuminate in a first color, such as green, when a lock is in an unlocked position. The lights illuminate in a second color, such as red, when a lock is in a locked position. The lights are suitably high intensity red and green LEDs. In one embodiment, the clear acrylic plates 160 are frosted to provide dissipation of the first and second colored (red and green) lights.

Figure 7:
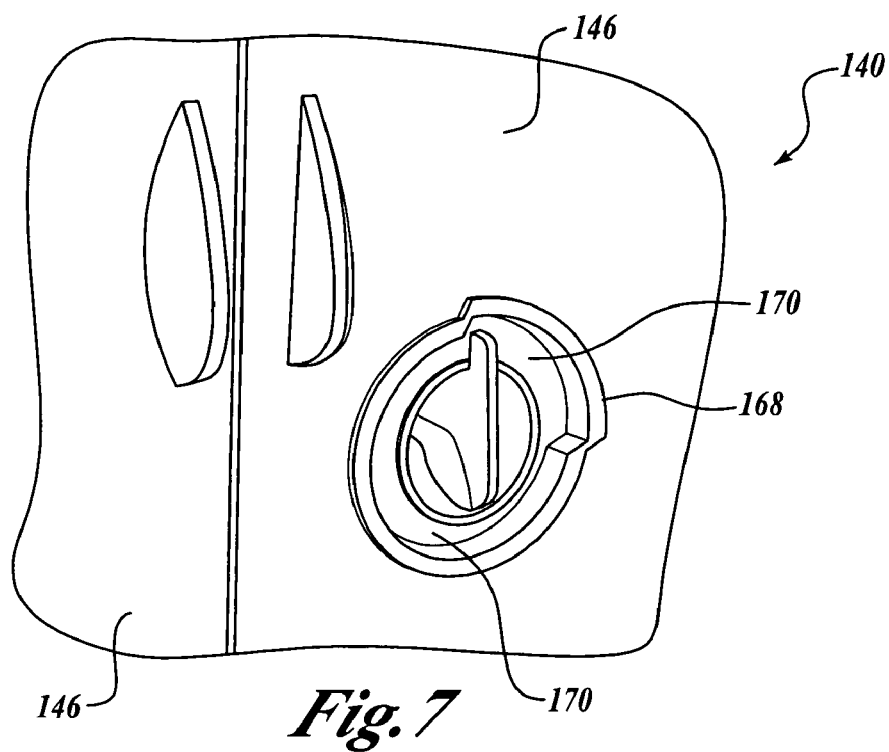
FIGS. 7 and 8 are views of internal locking mechanisms for the toilet unit shown in FIG. 5.
Figure 8:
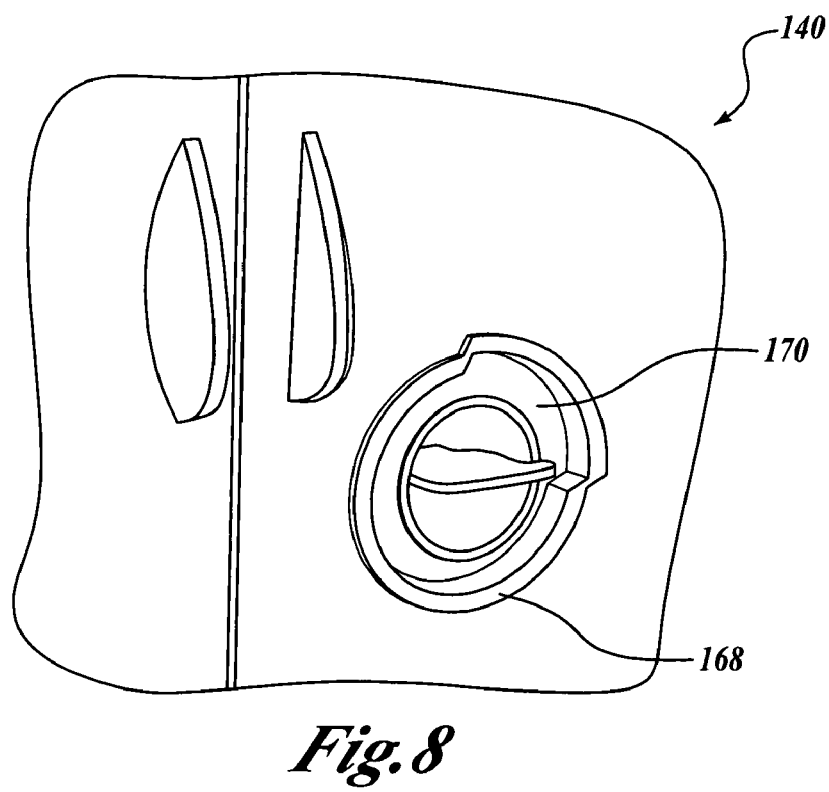
Figure 9:
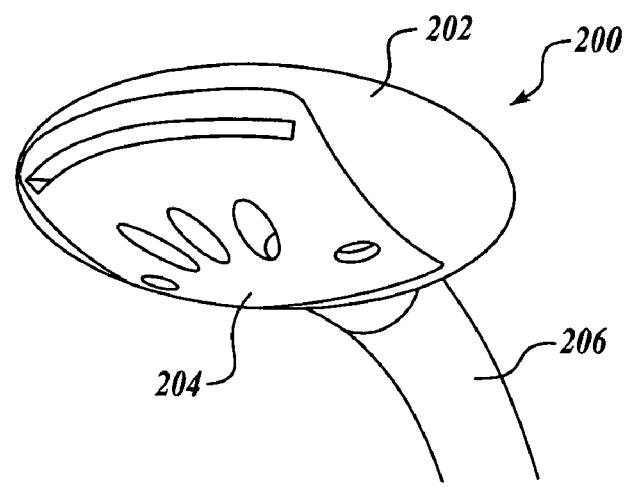
FIG. 9 is a perspective drawing of a faucet formed in accordance with an embodiment of the present invention.
Figure 10:
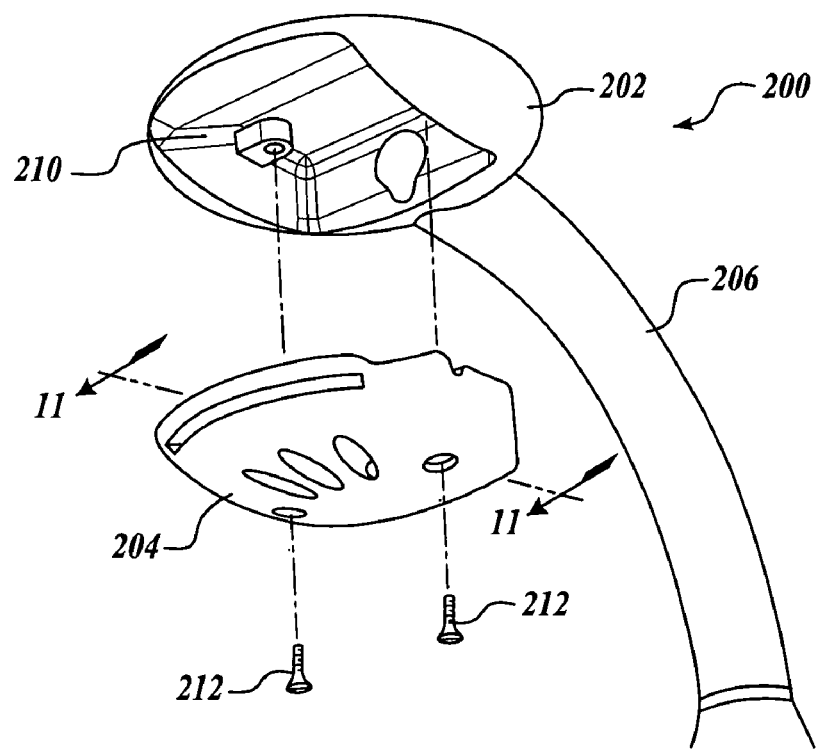
FIG. 10 is an exploded view of the faucet shown in FIG. 9.
Figure 11:
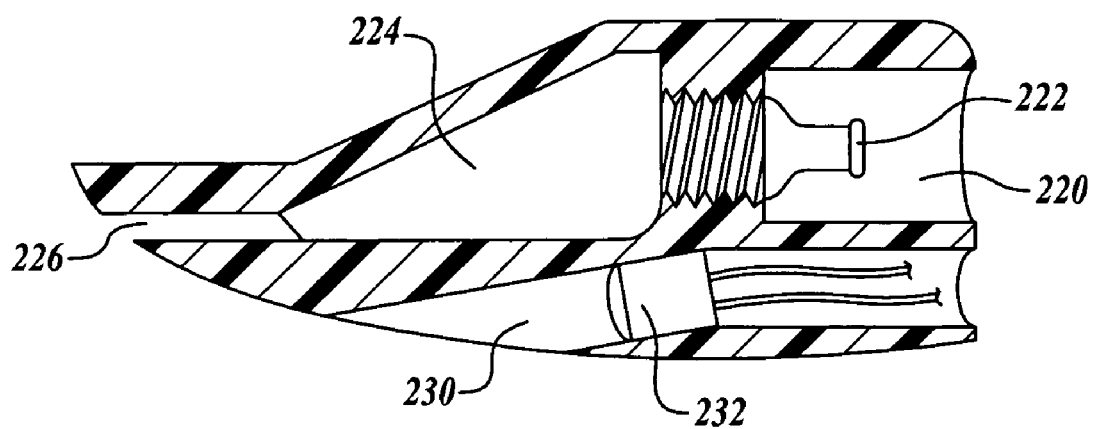
FIG. 11 is a cross sectional view of the faucet shown in FIG. 9.
Figure 12:
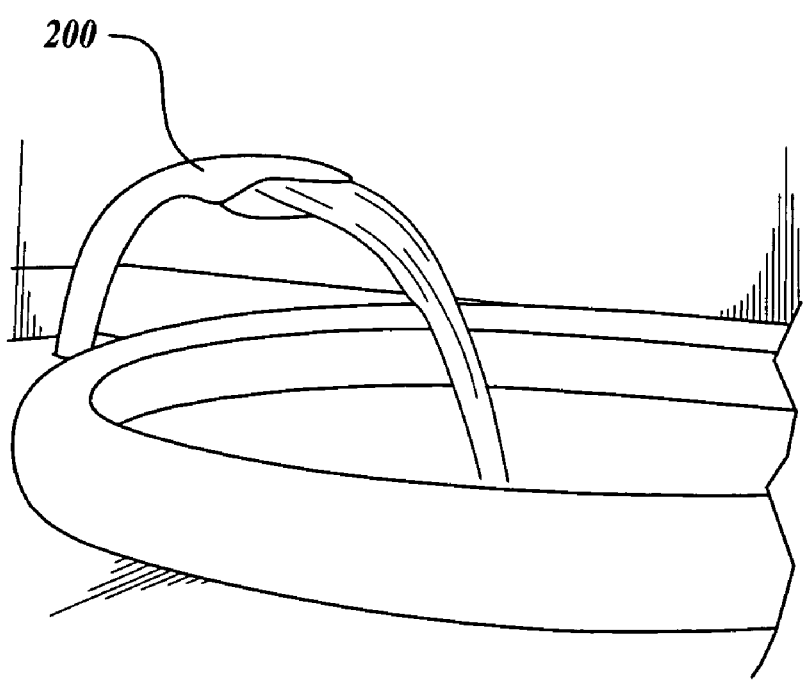
FIG. 12 is perspective view of the faucet shown in FIG. 9.

FIGS. 7 and 8 illustrate a locking switch 168 that is located on the interior of the two sliding panels 146. The locking switch 168 is suitably a rotating switch that, when placed in the vertical position, unlocks the two sliding panels 146. When the locking switch 168 is placed in the horizontal position the two sliding panels 146 become locked. In one embodiment, the locking mechanism that the locking switch 168 engages is an electromagnetic locking device (not shown). However, other locking devices may be used as desired, such as latching devices. Like the exterior handle housings 148, given by way of non-limiting example the locking switch 168 is outlined with a clear acrylic plate 170 with green and red lights disposed behind the clear acrylic plate 170. When the locking switch 168 is placed in the vertical position, the two sliding panels 146 are unlocked and a first set of colored (green) lights behind the clear acrylic plate 170 are illuminated. When the locking switch 168 is placed in the horizontal position, the two sliding panels 146 are locked and a second set of colored (red) lights behind the clear acrylic plate 170 are illuminated.

When the locking switch 168 is placed in the horizontal position, the two sliding panels 146 are suitably locked by activation of an electromagnetic lock. However, it will be appreciated that the two sliding panels 146 could be locked by a mechanical or electromechanical lock, as desired.

FIGS. 9–12 illustrate a faucet 200 formed in accordance with another embodiment of the present invention. The faucet 200 includes first and second components 202 and 204. The first component 202 is suitably a stainless steel head that is attached to a faucet neck 206. The first component 202 includes a cavity 210 for receiving the second component 204. The second component 204 is an insert that is suitably formed of acrylic and includes fasteners 212 that attach the second component 204 within the cavity 210. The second component 204 includes a first chamber 220 that includes a hose fitting 222 for receiving water from the faucet neck 206. The second component 204 also includes a water chamber 224 that receives water from the hose fitting 222 and directs the received water through an orifice 226. Below the orifice 226 is a cavity 230 that receives lights, such as LEDs 232. The LEDs 232 suitably include 5 LED lights, two of which light the second component 204 and three that are aimed at water exiting the orifice 226. Various colored LEDs can be used, as desired.

Figure 13:
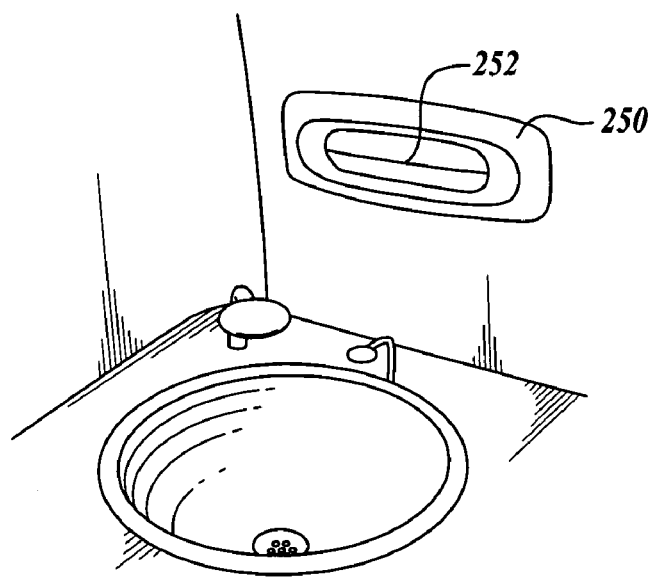
FIGS. 13 and 14 are perspective views of a sink and dispenser formed in accordance with an embodiment of the present invention.
Figure 14:
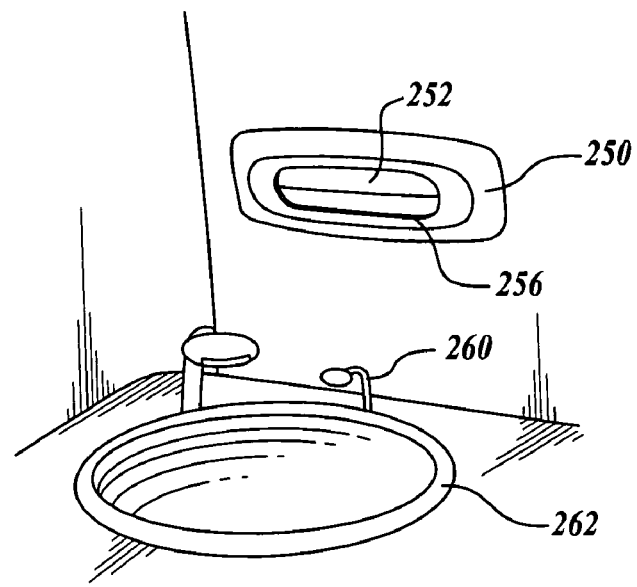

FIG. 13 illustrates a paper towel dispenser 250 that is mounted in a wall near a sink 262 that suitably includes a faucet like that shown in FIGS. 9–12. The paper towel dispenser 250 includes an opening 252 for retrieving paper towels. Positioned around the edge of the opening 252 is a light 256 that is suitably an electroluminescent wire, such as a fiber optic wire, or LEDs.

In another embodiment, a soap dispenser 260 is mounted adjacent the sink 262. The soap dispenser 260 includes a motion/proximity sensor (not shown) that causes soap to be dispensed when an occupant's hands are sensed within a threshold distance of the soap dispenser 260. The soap is suitably dispensed by any pressurized source known in the art, such as a pump that is activated by the sensor.

In one embodiment of the present invention, indicator lights within the lavatory are choreographed to turn on at an appropriate time when a passenger needs to use an item associated with the corresponding indicator light. The following are situations for which the indicator lights suitably may be used. The indicator lights would not necessarily be limited to the functions described below.

For example, when the passenger lifts the toilet lid an indicator light comes on, thereby highlighting a toilet paper dispenser and a flush button (not shown). One way to accomplish this is to use electroluminescent wire around a toilet paper dispenser and a flush button (not shown). The electroluminescent wire is connected to a switch coupled to the toilet seat. Alternatively an LED backlight may be used to highlight the flush button. Other choreographed illuminations may occur as desired, such as the sink with soap dispenser are illuminated after a flush has occurred.

Figure 15:
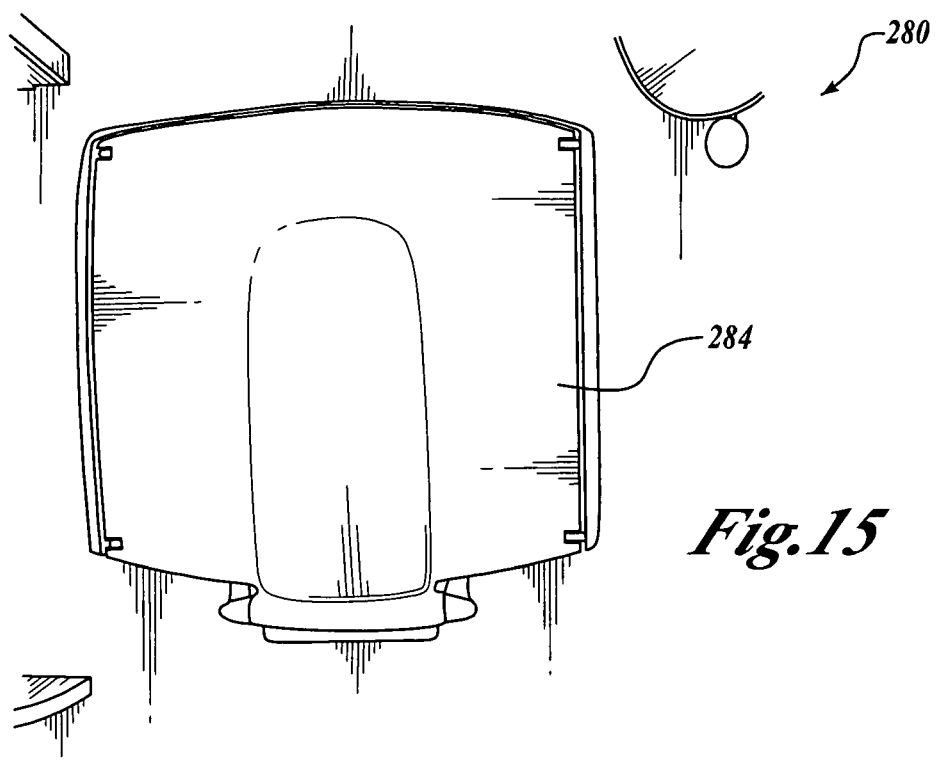
FIG. 15–17 are perspective views of a baby changer formed in accordance with an embodiment of the present invention.
Figure 16:
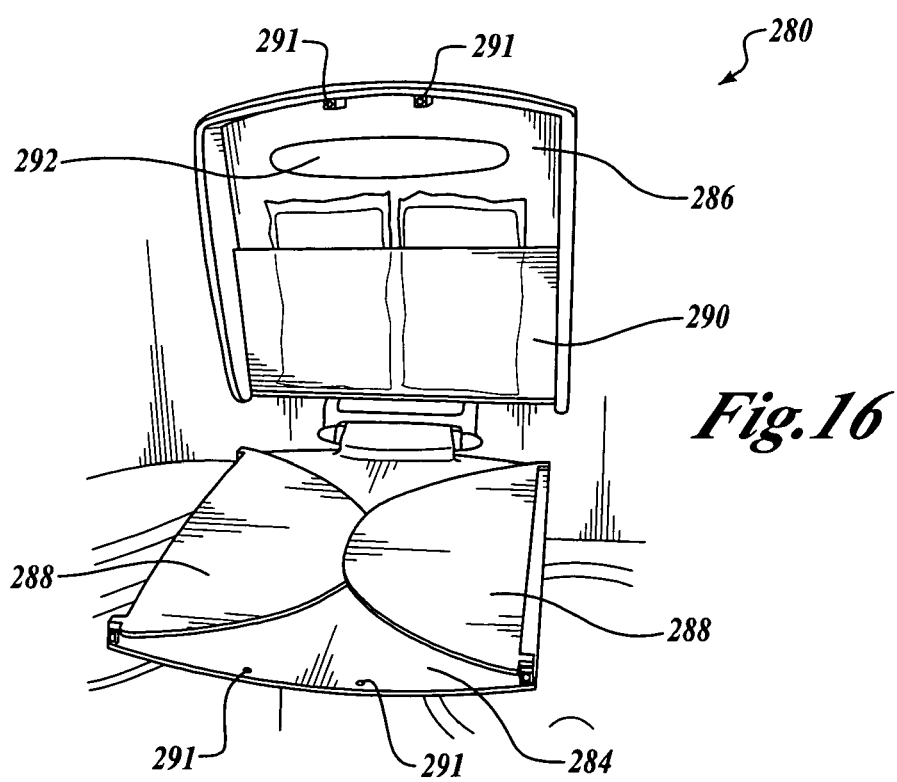
Figure 17:
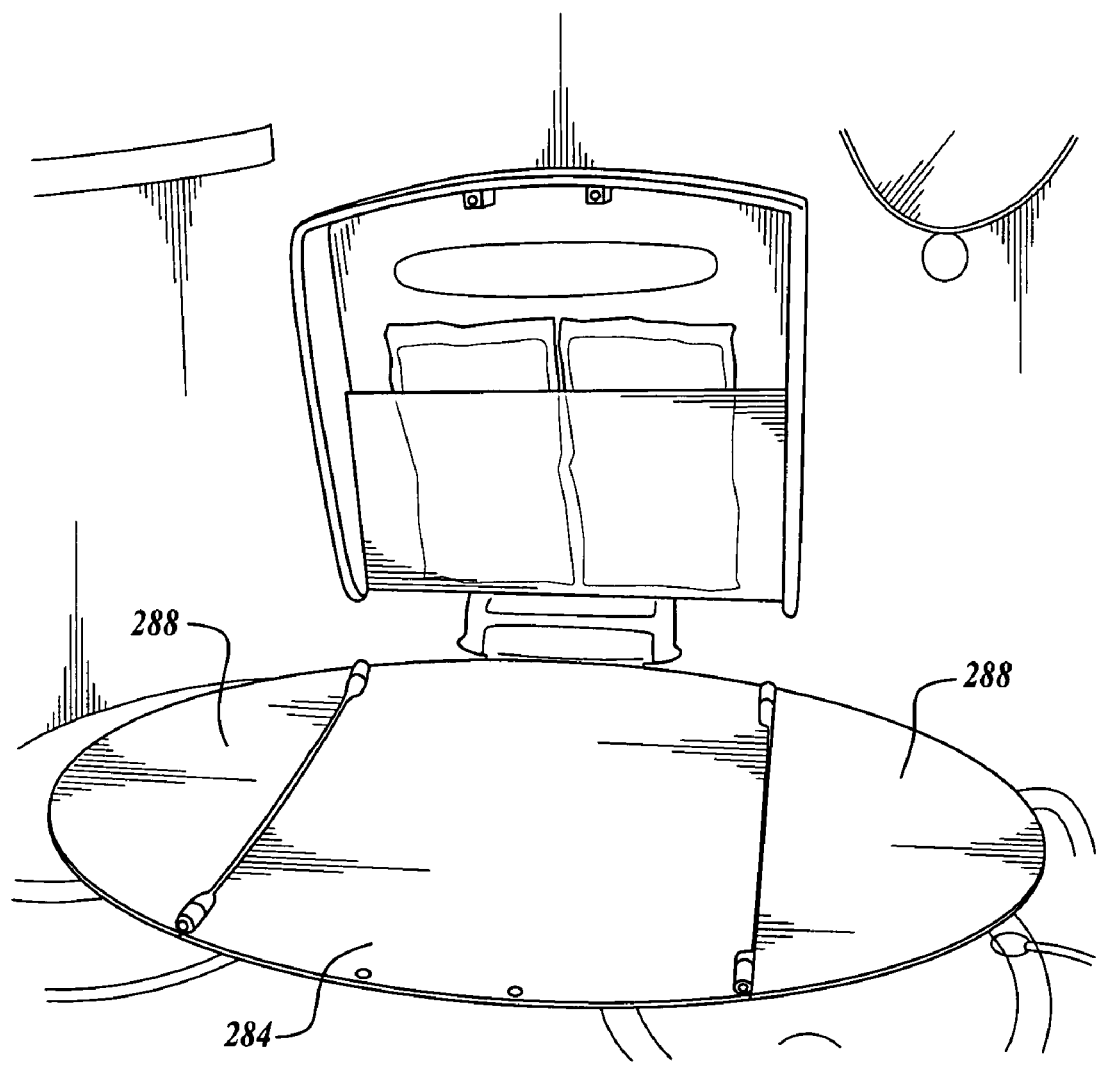

FIGS. 15–17 illustrate a baby-changing device 280 that includes a wall section 286 and a tray section 284. Referring to FIG. 15, the tray section 284 is suitably stored in a vertical position. The tray section 284 is hingedly attached to the bottom of the wall section 286 so that the tray section 284 folds out to a horizontal position. Referring to FIGS. 16 and 17, two flaps 288 are hingedly attached to ends of the tray section 284 and the two flaps 288 fold out to a horizontal position for changing a baby. The wall section 286 suitably includes a pocket 290 for receiving diapers or other amenities as desired. A light 292 is flush mounted above the pocket 290. An attachment device 291, such as without limitation a magnet pair, keeps the tray section 284 in a closed position with the wall section 286.

Figure 18:
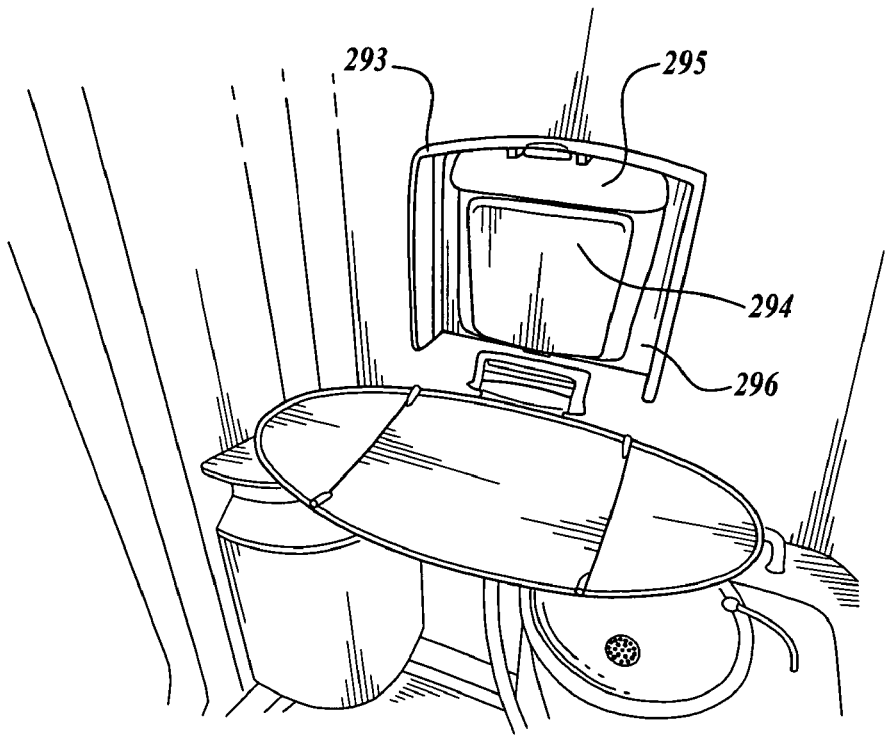
FIGS. 18 and 19 are perspective views of a baby changer and seat formed in accordance with an embodiment of the present invention.
Figure 19:
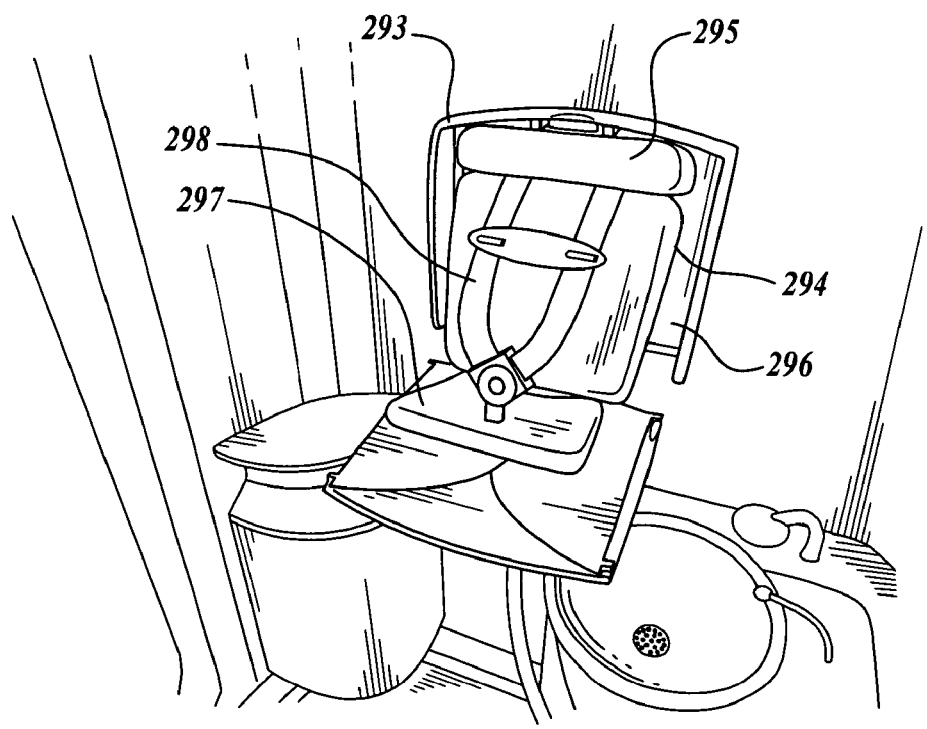

Referring to FIGS. 18 and 19, a baby change device 293 includes a child seat 294. The child seat 294 includes a back section 295, a seat 297, and a harness 298. The back section 295 is mounted to a wall section 296 of the baby change device 293. The seat 297 is hingedly attached to the back section 295. The harness 928 is attached to the back section 295 and the seat 297. The harness 298 includes straps that are placed over a child's head with a strap spreader device resting on the child's chest. The straps are secured to an upper portion of the back section 295. At the other end of the straps an attachment mechanism attaches to a base piece of the harness 298 that is secured to the seat 297. The child's legs straddle the base piece of the harness 298 with their seat resting on the seat 297. A child is placed in the child seat 294 for safety to allow the attendant of the child to attend to other matters.

Figure 20:
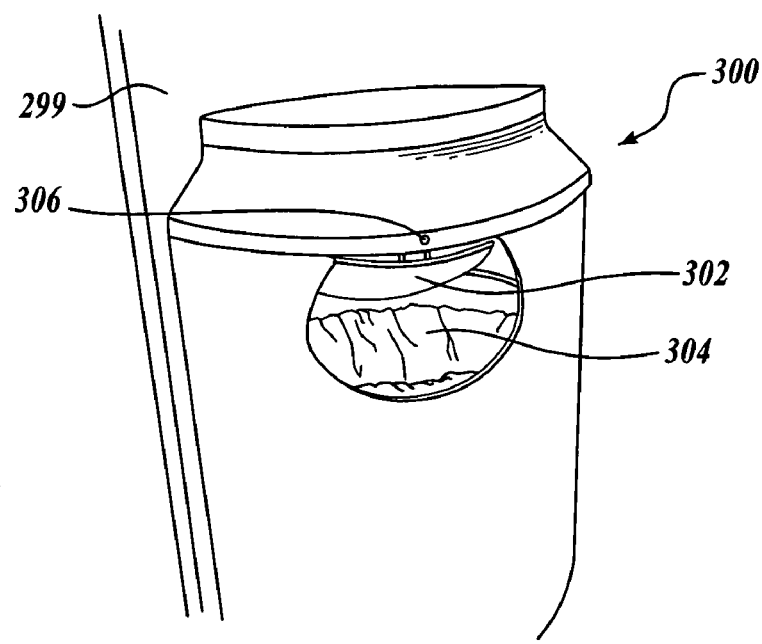
FIG. 20 is an interior perspective view of a trash can holder formed in accordance with an embodiment of the present invention.

FIG. 20 illustrates a lavatory garbage can 300 within a bathroom unit 299 according to another embodiment of the invention. The garbage can 300 includes an automatic door or flap 302 that provides access to a wastebasket 304. The automatic door 302 includes a sensor 306, such as a motion sensor, that senses when a user's hand is within a threshold distance. When the hand is sensed within a threshold distance, a door is mechanically moved into an open position by an acceptable motive force, such as an electric motor or a biasing device, such as a spring. A light located around or near the flap 302, such as without limitation an electroluminescent wire, is activated when a motion sensor (not shown) mounted at or near the faucet 200 (FIGS. 9–14) detects a user. Given by way of non-limiting example, the sensors described above are suitably any acceptable sensor known in the art, such as an infrared motion detector.

Figure 21:
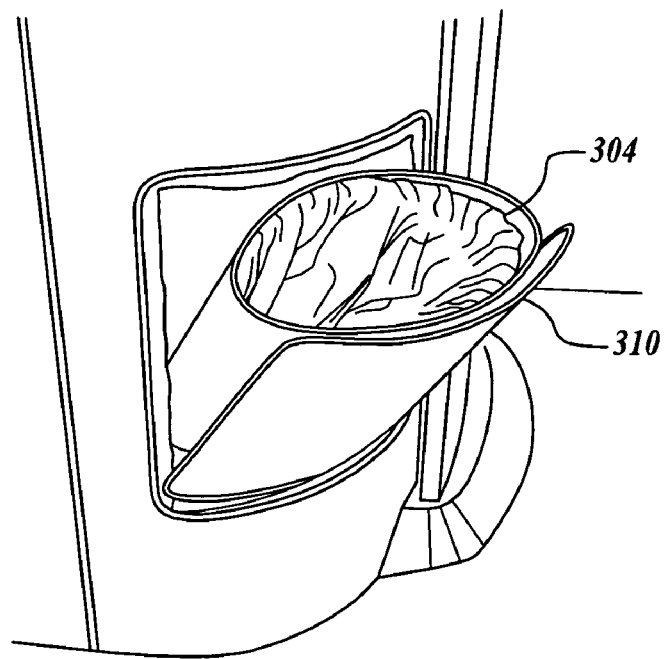
FIG. 21 is an exterior perspective view of a trash can exit door formed in accordance with an embodiment of the present invention.

As shown in FIG. 21, the lavatory garbage can 300 includes an exterior door 310 that allows access to the wastebasket 304 from outside the bathroom unit 299.

Figure 22:
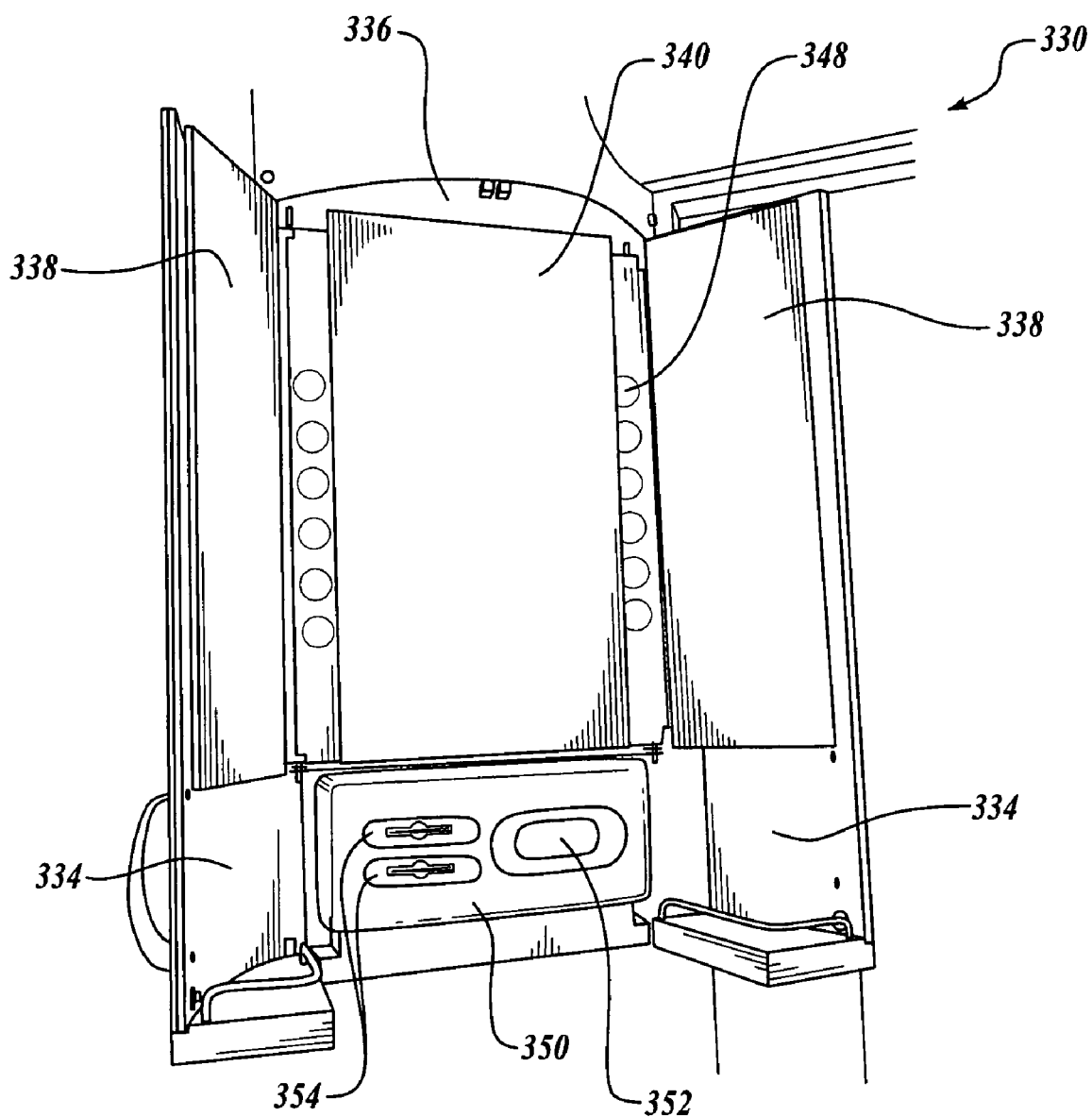
FIG. 22 is a perspective view of a vanity mirror formed in accordance with an embodiment of the present invention.

FIG. 22 illustrates a vanity mirror unit 330 according to another embodiment of the invention. Two doors 334 are hindgedly attached to a cabinet base 336. Mirrors 338 are mounted on the inside of the two doors 334. A mirror 340 is mounted to a support structure (not shown) that mechanically moves the mirror towards a user when the two doors 334 are opened. Lights 348 are attached to the cabinet base 336 behind the mirror 340. Amenities 350 are provided below the mirror 340 on the cabinet base 336. The lights are adjustable in brightness and color temperature. The amenities 350 include a tissue dispenser 352 and lotion or other dispensers 354, such as dispensers or the like.

Figure 23:
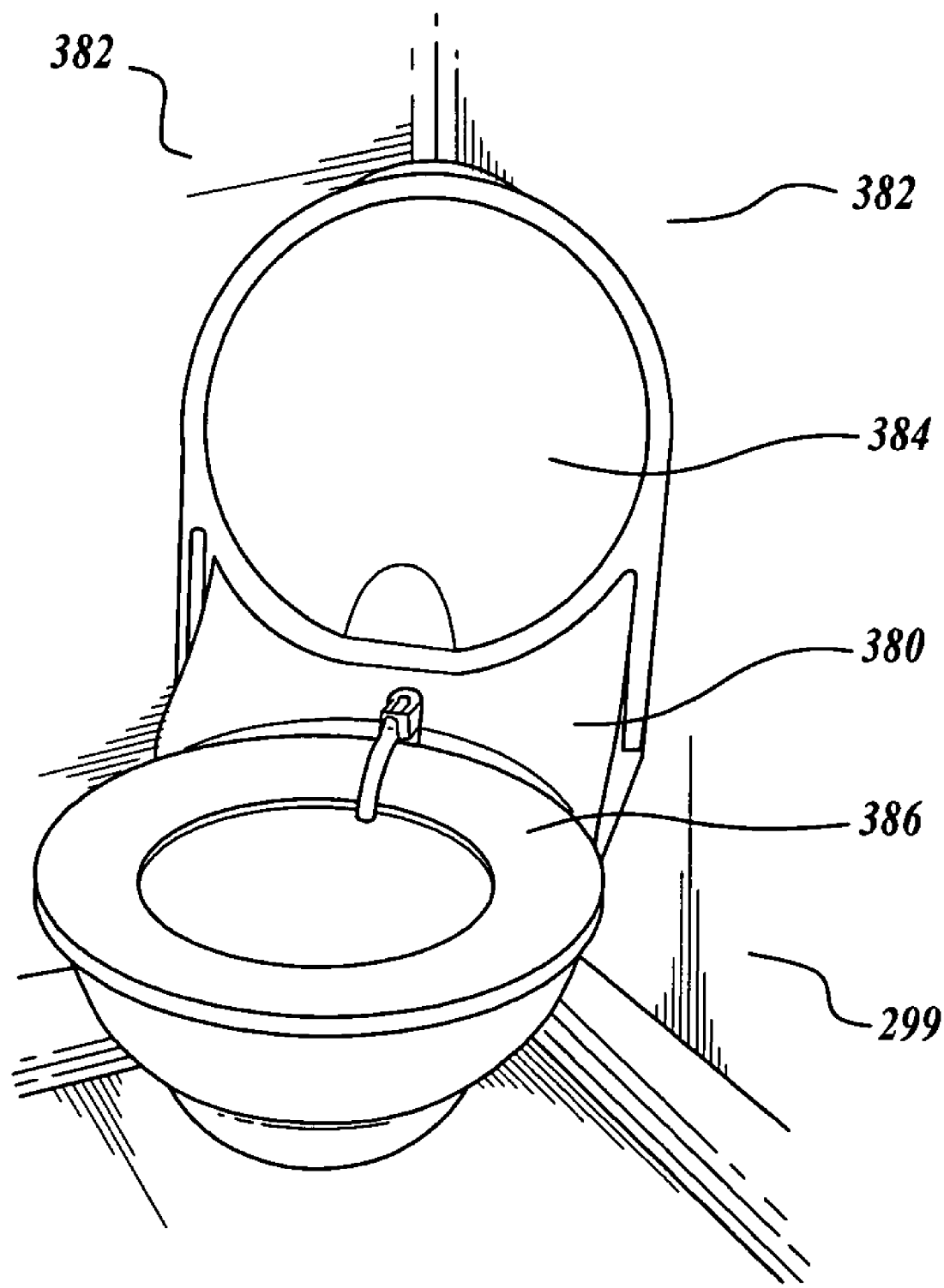
FIG. 23 is a perspective view of a toilet used in the toilet unit of the present invention.

FIG. 23 illustrates a toilet 380 that is mounted to two walls 382 that meet at a corner of the bathroom unit 299 and thus is suspended above a floor of the bathroom unit 298. In one embodiment the toilet 380 includes a seat 386, such as without limitation an automatic sanitizing (e.g., Sanisafe™ toilet seat system) toilet 380 includes a lid 384 that is hingedly attached to the toilet 380. In one embodiment the toilet 380 includes a position sensing switch (not shown) that senses when the lid 384 is in a position other that closed/down. The position sensing switch produces a signal that cause other lights in the bathroom unit 299 to illuminate. For example, when the sensor senses that at least one of the seat 386 or seat lid 384 is in at least one of an up position or a position between full up and full down, a first light around or near a flush button is illuminated and a second light around or near a toilet paper dispenser is illuminated.

With regards to the lighting used within the embodiments of the present invention, U.S. patent application Ser. No. 10/097,944 is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A lavatory for a cabin of an aircraft, the aircraft having plumbing components, the lavatory comprising:
   at least one stall unit having walls defining an interior region, the unit comprising:
      a single commode located in the interior region; and
      at least one sink located externally to the interior region and being unaccessible from within the interior region; and
   stall unit plumbing components coupled to the commode, the sink and the aircraft plumbing components,
   wherein the at least one sink is mounted to an external side of the stall unit wall, wherein the external side of the stall unit wall is adjacent to a passenger seating portion of the cabin.

2. The lavatory of claim 1, further comprising at least one urinal located in the interior region, the at least one urinal being unsuitable for seated use by a passenger.

3. The lavatory of claim 1, further comprising:
   at least one door; and
   a door locking switch included within the door, the locking switch including:
      a locking dial; and
      a two colored lighted panel positioned adjacent to the locking dial,
   wherein when the locking dial is in a first position the panel illuminates a first color and when the dial is in a second position the panel illuminates a second color which is different than the first color.

4. A lavatory complex for a cabin of an aircraft, the aircraft having plumbing components, the lavatory complex comprising:

a male lavatory facility including:
  at least one stall unit, wherein the at least one stall unit includes a single commode;
  at least one urinal; and
  stall unit plumbing components coupled to the at least one stall unit, the at least one urinal and the aircraft plumbing components;
a female lavatory facility including:
  first and second stall units;
  a first separator separating the first and second stall units from each other; and
at least one sink separated from at least one of the first and second stall units and
at least one sink mounted to an external side of a stall unit wall separating at least one of the male lavatory facility and the female lavatory facility from a remainder of the cabin, and the external side of the stall unit wall is adjacent to a surrounding portion of the cabin.

5. The lavatory complex of claim 4, wherein the male lavatory facility further includes a second sink disposed on a same side of the stall unit wall as the at least one urinal.

6. The lavatory complex of claim 4, wherein the female lavatory facility further includes a second separator for separating at least one of the first and second stall units from the rest of the aircraft cabin.

7. A lavatory complex for a cabin of an aircraft, the aircraft having plumbing components, the lavatory complex comprising:

a male lavatory facility including:
  at least one stall unit, wherein the at least one stall unit includes a commode;
  at least one urinal, the at least one urinal being unsuitable for seated use by a passenger;
  a first separator for separating the at least one stall unit from the at least one urinal; and
  a second separator for separating the at least one stall unit and the at least one urinal from the rest of the aircraft cabin; and
  male lavatory plumbing components coupled to the commode, the at least one urinal, and the aircraft plumbing components; and
a female lavatory facility including:
  at least one stall unit, wherein the at least one stall unit includes a commode;
  a first separator at least partially defining the at least one stall unit; and
  a second separator for separating the at least one stall unit from the rest of the aircraft cabin; and
  female lavatory plumbing components coupled to the commodes of the female facility and the aircraft plumbing components; and
at least one sink located externally to the male lavatory facility and the female lavatory facility on an external portion of at least one of the male and female lavatory facilities adjacent to a passenger seating portion of the cabin.

* * * * *